United States Patent
Cheng et al.

(10) Patent No.: US 8,642,499 B2
(45) Date of Patent: Feb. 4, 2014

(54) CATALYTIC CRACKING CATALYST COMPOSITIONS HAVING IMPROVED BOTTOMS CONVERSION

(75) Inventors: Wu-Cheng Cheng, Ellicott City, MD (US); Kevin John Sutovich, Hampstead, MD (US); Ruizhong Hu, Cooksville, MD (US); Ranjit Kumar, Clarksville, MD (US); Xinjin Zhao, Houston, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 652 days.

(21) Appl. No.: 12/517,974

(22) PCT Filed: Nov. 21, 2007

(86) PCT No.: PCT/US2007/024335
§ 371 (c)(1),
(2), (4) Date: Nov. 4, 2010

(87) PCT Pub. No.: WO2008/073221
PCT Pub. Date: Jun. 19, 2008

(65) Prior Publication Data
US 2011/0036754 A1      Feb. 17, 2011

Related U.S. Application Data

(60) Provisional application No. 60/873,467, filed on Dec. 7, 2006.

(51) Int. Cl.
*C10G 11/04* (2006.01)

(52) U.S. Cl.
USPC ............. 502/234; 502/64; 502/67; 502/73; 502/79; 502/235; 502/238; 502/263; 208/106; 208/113; 208/120.01

(58) Field of Classification Search
USPC ......... 502/64, 67, 73, 79, 234, 235, 238, 263; 208/106, 113, 120.01
See application file for complete search history.

(56) References Cited

U.S. PATENT DOCUMENTS

| | | | |
|---|---|---|---|
| 2,196,016 A | 4/1940 | Huehn et al. | 23/50 |
| 3,503,874 A | 3/1970 | Michalko | 208/120 |
| 4,176,090 A | 11/1979 | Vaughan et al. | 252/455 |
| 5,077,253 A | 12/1991 | Chu et al. | 502/61 |
| 5,779,882 A | 7/1998 | Chester et al. | 208/120 |
| 5,851,378 A | 12/1998 | Vogt et al. | 208/111 |
| 6,177,373 B1 | 1/2001 | Sterte et al. | 502/4 |

(Continued)

FOREIGN PATENT DOCUMENTS

CA      967136      5/1975 ................ 252/60

OTHER PUBLICATIONS

Maurer, T. et al. (2001). Ind. Eng. Chem. Res., 40, 2573-2579.*

(Continued)

*Primary Examiner* — Brian McCaig
(74) *Attorney, Agent, or Firm* — Charles A. Cross (57) ABSTRACT

A particulate catalytic cracking catalyst which comprises a zeolite having catalytic cracking ability under catalytic cracking conditions, added silica, precipitated alumina and, optionally clay. The catalytic cracking catalyst has a high matrix surface area and is useful in a catalytic cracking process, in particularly, a fluid catalytic cracking process, to improve bottoms conversion at a constant coke formation.

11 Claims, 4 Drawing Sheets

(56) References Cited

U.S. PATENT DOCUMENTS

| | | | |
|---|---|---|---|
| 6,200,464 | B1 | 3/2001 | van Houtert et al. .......... 208/119 |
| 6,605,207 | B2 | 8/2003 | Cheng et al. .............. 208/120.01 |
| 6,613,710 | B2 | 9/2003 | Ray et al. ......................... 502/68 |
| 2002/0185412 | A1 | 12/2002 | Cheng et al. .............. 208/120.01 |
| 2003/0121827 | A1 | 7/2003 | van den Berge et al. 208/120.01 |
| 2005/0269246 | A1 | 12/2005 | Wachter et al. ................ 208/113 |
| 2006/0052272 | A1* | 3/2006 | Meli et al. ...................... 510/504 |

OTHER PUBLICATIONS

Venuto and Habib, "Fluid Catalytic Cracking with Zeolite Catalysts," Marcel Dekker, New York 1979, ISBN 0-8247-6870-1.

Sadeghbeigi, Fluid Catalytic Cracking Handbook. Gulf Publishing Company, Houston, 1995, ISBN 0-88415-290-1.

G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis, vol. 76, p. 257, Elsevier Science Publishers B.V., Amsterdam 1993, ISBN 0-444-89037-8.

G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52.

* cited by examiner

CATALYTIC CRACKING CATALYST COMPOSITIONS HAVING IMPROVED BOTTOMS CONVERSION

RELATED APPLICATIONS

This application claims priority and the benefit of the filing date of U.S. Provisional Patent Application No. 60/873,467 filed Dec. 7, 2006, and International Application No. PCT/US2007/024335 filed Nov. 21, 2007, the disclosures of which are hereby incorporated herein by reference.

FIELD OF THE INVENTION

The present invention relates to novel catalytic cracking catalysts having a high matrix surface area, the process of preparing the catalysts, and the process of using the catalysts to improve bottoms conversion during a catalytic cracking process.

BACKGROUND OF THE INVENTION

Catalytic cracking is a petroleum refining process that is applied commercially on a very large scale. A majority of the refinery petroleum products are produced using the fluid catalytic cracking (FCC) process. An FCC process typically involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 50 to about 150 µm, preferably from about 50 to about 100 µm.

The catalytic cracking occurs when relatively high molecular weight hydrocarbon feedstocks are converted into lighter products by reactions taking place at elevated temperature in the presence of a catalyst, with the majority of the conversion or cracking occurring in the vapor phase. The feedstock is converted into gasoline, distillate and other liquid cracking products as well as lighter gaseous vaporous cracking products of four or less carbon atoms per molecule. The vapor partly consists of olefins and partly of saturated hydrocarbons. The vapor also contains bottoms with coke being deposited on the catalyst. It is desirable to produce the lowest bottoms at a constant coke level.

FCC catalysts normally consist of a range of extremely small spherical particles. Commercial grades normally have average particle sizes ranging from about 50 to 150 µm, preferably from about 50 to about 100 µm. The cracking catalysts are comprised of a number of components, each of which is designed to enhance the overall performance of the catalyst. Some of the components influence activity and selectivity while others affect the integrity and retention properties of the catalyst particles. FCC catalysts are generally composed of zeolite, active matrix, clay and binder with all of the components incorporated into a single particle or are comprised of blends of individual particles having different functions.

Bottoms upgrading capability is an important characteristic of an FCC catalyst. Improved bottoms conversion can significantly improve the economics of an FCC process by converting more of the undesired heavy products into more desirable products such as light cycle oil, gasoline and olefins. Conventional wisdom has suggested that as matrix surface area increases in a cracking catalyst, the yield of bottoms decreases.

One attempt to increase catalytic matrix surface area has been to control alumina distribution within an alumina sol based cracking catalyst. For example, aluminum sol based FCC catalysts typically consist of a zeolite (e.g. faujasite zeolite), one or more matrix aluminas and/or silica-aluminas, clay (e.g. kaolin clay) bound with an aluminum chlorhydrol binder. The catalysts are typically prepared by spray drying an aqueous slurry of the zeolite, clay and alumina chlorhydrol. The sprayed dried catalyst particles are thereafter calcined typically at a temperature of about 595° C. and, optionally, ion exchanged to remove undesirable impurities.

To increase matrix surface area, however, the sprayed catalyst particles have been calcined at a milder calcination temperature, e.g. about 400° C. The calcined catalyst particles were then re-slurried with an aqueous based solution at a pH of about 7 to re-dissolve alumina from the binder system and re-precipitate alumina on the surface of the zeolite containing catalyst particles. While this process can generate an increase in matrix surface area on the surface of the final catalyst, the process has undesirable limitations. A major limitation of this process has been the proportional relationship between the increase in matrix surface area generated and the amount of zeolite in the catalyst system. That is, an increase in the matrix surface area requires a proportional increase in the amount of zeolite in the catalyst system. An increase in zeolite content, however, may not be desirable when attempting to maximize LCO yield and can thereby limit the range of application of the catalyst.

In addition to increased bottoms conversion, it is also important to avoid or minimize the output of coke during an FCC process. Consequently, there exists a need in the refining industry to provide catalysts that minimize coke formation while simultaneously enhancing bottoms cracking performance during a catalytic cracking process.

SUMMARY OF THE INVENTION

The present invention is directed to alumina sol based catalytic cracking catalysts having a high matrix surface area. The catalytic cracking catalyst compositions of the invention are useful to increase bottoms conversion at constant coke formation during a catalytic cracking process as compared to bottoms conversion obtainable using conventional alumina sol based zeolitic catalytic cracking catalysts.

The present invention also provides a process of preparing the high matrix surface area catalytic cracking catalysts of the invention. Advantageously, the process of the invention allows for the independent control of matrix surface area generation apart from zeolite content and catalytic cracking activity. The invention process decouples these two parameters by introducing a high surface area inorganic oxide component having low cracking activity into the catalysts, in addition to the zeolite and aluminum chlorhydrol binder component typically comprising conventional alumina sol based cracking catalysts. The introduction of the high surface area, low cracking active component permits the generation of a high matrix surface area while minimizing or avoiding an undesirable increase in cracking activity, typically associated with a high zeolite content.

In accordance with the present invention, the catalyst composition comprises a particulate composition comprising at least one zeolite cracking component having a negative surface charge at a pH of about 7, at least one siliceous metal oxide having a negative surface charge at a pH of about 7 and a binder system comprising precipitated alumina. The catalyst composition has a matrix surface area of greater than 80 $m^2/g$. In a preferred embodiment of the invention, the catalyst composition of the invention has a zeolite to siliceous metal oxide ratio of about 2.

In accordance with the process of the present invention, the catalyst compositions are prepared by a process comprising spray drying an aqueous slurry comprising a zeolite component having catalytic cracking activity and having a negative surface charge at a pH of about 7, a siliceous metal oxide having a negative surface charge at a pH of about 7 and an amount of aluminum chlorhydrol sufficient to provide catalyst particles having a DI of less than 50. The spray-dried catalyst particles are calcined, preferably at a temperature of about 400° C. The calcined catalyst particles are thereafter re-slurried in an aqueous base at a pH of about 7, to precipitate alumina uniformly throughout the final catalytic composition.

Accordingly, it is an advantage of the present invention to provide high matrix surface area catalyst compositions that are useful to improve bottoms conversion during a catalytic cracking process.

It is also an advantage of the present invention to provide high matrix surface area catalyst compositions that improve bottoms conversion during a catalytic cracking process at constant coke formation.

Another advantage of the present invention is to provide high matrix surface area FCC catalyst compositions having low zeolite content.

It is further an advantage of the present invention to provide a process for the preparation of a high matrix surface area cracking catalyst, which catalyst is useful to improve bottoms conversion at constant coke formation during a catalytic cracking process.

Another advantage of the present invention is to provide a process of controlling surface area generation independent of zeolite content and cracking activity during the preparation of a high matrix surface area, alumina sol based FCC catalyst composition.

It is yet another advantage of the present invention to provide improved FCC processes using compositions and processes in accordance with the present invention.

These and other aspects of the present invention are described in further details below.

DETAILED DESCRIPTION OF THE INVENTION

The present invention encompasses the discovery that the inclusion of an added siliceous component in certain catalytic cracking catalyst compositions, in particularly alumina sol based FCC catalyst compositions, is very effective to prepare catalyst compositions having increased matrix surface area without the need to proportionally increase the zeolite content of the catalyst. The compositions exhibit improved bottoms conversion during a catalytic cracking process at a constant formation of coke when compared to the bottoms conversion typically achieved using conventional catalytic cracking catalyst compositions during a catalytic cracking process.

Catalyst compositions of the invention typically comprise particulate compositions comprising at least one zeolite component having catalytic cracking activity under catalytic cracking conditions and having a negative surface charge at a pH of about 7; at least one siliceous inorganic oxide component having a negative surface charge at a pH of about 7 and precipitated alumina. Particulate catalyst compositions of the invention typically have a matrix surface area of greater than 60 $m^2/g$, preferably greater than 80 $m^2/g$. Preferably, the catalyst compositions of the invention have a zeolite to siliceous metal oxide ratio of about 0.5.

The zeolite component useful in the invention composition may be any zeolite which has catalytic cracking activity under catalytic cracking conditions, in particular fluid catalytic cracking conditions, and which has a negative surface charge at a pH of about 7. Typically the zeolitic component is a synthetic faujasite zeolite such as USY or REUSY. It is also contemplated that the zeolites may be partially ion exchanged to lower the soda level thereof prior to incorporation in the catalyst. It is also contemplated that the zeolite component may comprise a mixture of zeolites such as synthetic faujasite in combination with mordenite and the ZSM type zeolites. Generally, the zeolite cracking components comprises from about 5 to about 60 wt % of the cracking catalyst. Preferably the zeolitic cracking components comprises from about 10 to about 50 wt %, most preferably, from about 20 to about 45 wt %, of the catalyst composition.

The siliceous metal oxide component used in the invention composition may be any siliceous metal oxide having a negative surface charge at a pH of about 7. Preferably, the siliceous metal oxide is a precipitated silica or a silica gel. Other siliceous metal oxide materials useful in the invention include, but are not limited to, colloidal silica, zeolitic silicas such as beta, mordenite, chabasite, ferriette and the like, and mesoporous silica materials such as MCM-41 or MCM-22. Typically, the catalyst compositions of the invention comprise at least about 5 wt % of the siliceous metal oxide component. Preferably, catalysts of the invention comprise from about 5 to about 40 wt %, most preferably from about 10 to about 25 wt %, of the siliceous metal oxide component.

In one embodiment of the invention, the catalyst compositions comprise a zeolite:siliceous metal oxide ratio of about 0.5. In a preferred embodiment of the invention, the catalyst composition of the invention has a zeolite:siliceous metal oxide ratio ranging from about 0.1 to about 10, and more preferably, from about 0.2 to about 5.0. In an even more preferred embodiment of the invention, the catalyst composition of the invention has a zeolite:siliceous metal oxide ratio ranging from about 0.25 to about 4 and most preferably, from about 0.5 to about 2.

The precipitated alumina component comprising the catalyst of the invention is formed in situ by precipitating alumina from a binder system formed from aluminum chlorhydrol during preparation of the catalyst. Aluminum chlorhydrol used in the practice of the present invention is readily available from commercial sources and typically possesses the formula $Al_2(OH)_5Cl$ The aluminum chlorhydrol is frequently referred to in the art as polymeric cationic hydroxy aluminum complexes or basic aluminum chlorhydroxides which are polymers formed from a monomeric precursor. For the purpose of the present application, the binder component will be referred to as aluminum chlorhydrol. The preparation of the aluminum chlorhydrol solution is typically disclosed in U.S. Pat. No. 2,196,016, Canadian Pat. No. 967,136, and in U.S. Pat. No. 4,176,090. Typically, preparation of aluminum chlorhydrol involves reacting aluminum metal and hydrochloric acid in amounts that will produce a composition having the formula indicated above. Furthermore, the aluminum chlorhydrol may be obtained using various sources of aluminum such as alumina ($Al_2O_3$), clay and/or mixtures of alumina and/or clay with aluminum metal.

Typically, catalyst compositions in accordance with the present invention comprise an amount of precipitated alumina sufficient to bind the catalyst particle and form particles having a Davison Attrition Index (DI) of less than 50. Preferably, the amount of precipitated alumina ranges from about 5% to about 50% of the catalyst composition. Most preferably, the amount of precipitated alumina ranges from about 15% to about 25% of the catalyst composition.

The invention catalyst may optionally include clay. While kaolin is the preferred clay component, it is also contemplated that other clays, such as modified kaolin (e.g. metakaolin) may be optionally included in the invention catalyst. When used, the clay component will typically comprise from about 0 to about 70 wt %, preferably about 10 to about 50 wt % of the catalyst composition.

Optionally, catalyst compositions of the invention may also comprise at least one or more matrix material. Suitable matrix materials include alumina, silica-alumina, and the like. The matrix material may be present in the invention catalyst in an amount ranging from about 5 to about 30 wt %, preferably about 10 to about 20 wt %.

Catalyst compositions of the invention have a high matrix area, that is, the catalyst compositions have a mesoporous surface area of greater than 60 $m^2/g$, preferably greater than 80 $m^2/g$. For purposes of this invention the term "mesoporous" is used herein to indicate a material having pores with diameters in the approximate range of about 0.003 to about 0.01 μm.

The particle size and attrition properties of the invention catalyst affect fluidization properties in the catalytic cracking unit and determine how well the catalyst is retained in the commercial unit, especially in an FCC unit. The catalyst composition of the invention typically has a mean particle size of about 45 to about 200 μm, more preferably from about 50 to about 150 μm. Catalyst particles in accordance with the present invention have good attrition properties as indicated by a DI of less than 50, more preferably less than 20 and most preferably less than 15.

Generally, catalyst compositions of the invention are prepared by forming an aqueous slurry which comprises about 5 to about 50 wt % of aluminum chlorhydrol, preferably about 15 to about 25 wt % of aluminum chlorhydrol, expressed as $Al_2O_3$, about 5 to about 60 wt % of zeolite component, about 5 to about 60 wt % of the siliceous inorganic oxide component, and optionally, from about 0 to about 70 wt % of clay. The aqueous slurry is milled to obtain a homogeneous or substantially homogeneous slurry, i.e. a slurry wherein all the solid components of the slurry have an average particle size of less than 10 μm. Alternatively, the components forming the slurry are milled prior to forming the slurry. The aqueous slurry is thereafter mixed to obtain a homogeneous or substantially homogeneous aqueous slurry.

The aqueous slurry is thereafter subjected to a spraying step wherein the slurry is spray dried using conventional spray drying techniques. During the spray drying step, the slurry is converted into solid catalyst particles that comprise zeolite and the siliceous metal oxide component bound by an aluminum chlorhydrol binder. The spray dried catalyst particles typically have an average particle size on the order of about 60 to about 150 μm.

Following spray drying, the catalyst particles are calcined at temperatures ranging from about 370° C. to about 690° C. for a period of about 15 minutes to about 1.5 hours. Preferably, the catalyst particles are calcined at a temperature of about 400° C. for about forty-five minutes. During the calcination step, the aluminum chlorhydrol binder is converted to an alumina binder.

Subsequent to calcination, the catalyst particles are re-slurried in an aqueous base solution to precipitate alumina uniformly throughout the catalyst particles. The aqueous base solution comprises a sufficient amount of a base to maintain a pH of about 7 in the aqueous base slurry during the re-slurry step. Suitable bases include but are not limited to sodium hydroxide, ammonium hydroxide, potassium hydroxide, tetramethylammonium hydroxide and the like. Preferably, the base is ammonium hydroxide. The temperature during the re-slurry step ranges from about 5° C. to about 90° C. (preferably the temperature is maintained at about 75° C.) for about 1 minute to about 2 hours.

Formation of catalyst particles in accordance with the present invention is accomplished by a "heterocoagulation" process. That is, use is made of the attracting force between the precipitated alumina particles and the zeolite and siliceous inorganic oxide particles comprising the catalyst particles. This attraction force is caused by the charge difference resulting from the differences in the isoelectric point of the negatively charged zeolite and siliceous inorganic oxide components of the catalyst particles and the positively charged alumina particles comprising the matrix. The invention process results in a high quality, high surface area, precipitated alumina distributed uniformly or substantially uniformly throughout the catalyst particles.

The catalyst particles are thereafter optionally ion exchanged and/or washed, preferably with water, to remove excess alkali metal oxide and any other soluble impurities. The washed catalyst particles are separated from the slurry by conventional techniques, e.g. filtration, and dried at about 100° C. to about 200° C. to form a free flowing powder.

The primary components of catalyst compositions of the present invention comprise zeolite, a siliceous metal oxide component, precipitated alumina and optionally, clay and matrix materials, i.e. alumina, silica, and silica-alumina.

It is further within the scope of the present invention that catalyst compositions of the invention may be used in combination with other additives conventionally used in catalytic cracking process, in particular FCC processes, e.g. $SO_x$ reduction additives, $NO_x$ reduction additives, gasoline sulfur reduction additives, CO combustion promoters, additives for the production of light olefins, and the like.

For purposes of this invention, the phrase "catalytic cracking conditions" is used herein to indicate the conditions of a typical catalytic cracking process, which is almost invariably an FCC process, wherein a circulating inventory of cracking catalyst is contacted with a heavy hydrocarbon feedstock at elevated temperature to convert the feedstocks into lower molecular weight compounds.

The term "catalytic cracking activity" is used herein to indicate the ability of a compound to catalyze the conversion of hydrocarbons to lower molecular weight compounds under catalytic cracking conditions.

Cracking catalyst compositions of the invention are especially useful in conventional FCC processes or other catalytic cracking processes where hydrocarbon feedstocks are cracked into lower molecular weight compounds. Somewhat briefly, the FCC process involves the cracking of heavy hydrocarbon feedstocks to lighter products by contact of the feedstock in a cyclic catalyst recirculation cracking process with a circulating fluidizable catalytic cracking catalyst inventory consisting of particles having a size ranging from about 50 to about 150 μm, preferably from about 50 to about 100 µm. The catalytic cracking of these relatively high molecular weight hydrocarbon feedstocks result in the production of a hydrocarbon product of lower molecular weight. The significant steps in the cyclic FCC process are:
  (i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;
  (ii) the effluent is discharged and separated, normally in one or more cyclones, into a vapor phase rich in cracked product and a solids rich phase comprising the spent catalyst;
  (iii) the vapor phase is removed as product and fractionated in the FCC main column and its associated side columns to form gas and liquid cracking products including gasoline;
  (iv) the spent catalyst is stripped, usually with steam, to remove occluded hydrocarbons from the catalyst, after which the stripped catalyst is oxidatively regenerated in a catalyst regeneration zone to produce hot, regenerated catalyst, which is then recycled to the cracking zone for cracking further quantities of feed.

Typical FCC processes are conducted at reaction temperatures of about 480° C. to about 600° C. with catalyst regeneration temperatures of about 600° C. to about 800° C. As it is well known in the art, the catalyst regeneration zone may consist of a single or multiple reactor vessels. The compositions of the invention may be used in FCC processing of any typical hydrocarbon feedstock. The amount of the composition of the invention used may vary depending on the specific FCC process. Preferably, the amount of the compositions used is an amount sufficient to increase bottoms conversion at constant coke formation during a FCC process. Typically, the amount of the composition used is at least 0.01 wt %, preferably from about 0.01 to about 50 wt %, most preferably from about 0.1 to about 20 wt % of the cracking catalyst inventory.

Cracking catalyst compositions of the invention may be added to the circulating FCC catalyst inventory while the cracking process is underway or they may be present in the inventory at the start-up of the FCC operation. Alternatively, the catalyst particles may be added directly to the cracking zone, to the regeneration zone of the FCC cracking apparatus, or at any other suitable point in the FCC process.

It is also within the scope of the invention to use the cracking catalyst compositions of the invention alone or in combination with other conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and clays, such as kaolin clay. The Y zeolite may be present in one or more forms and may have been ultra stabilized and/or treated with stabilizing cations such as any of the rare earths.

The catalyst of the invention may be used to crack any typical hydrocarbon feedstocks, including but not limited to, hydrotreated vacuum gas oils and non-hydrotreated vacuum gas oils. Cracking catalyst compositions of the invention are especially useful for cracking hydrocarbon feedstocks containing heavy resid petroleum feeds with typically higher boiling point distribution and higher Conradson carbon content as compared to typical gas oils.

Compositions of the invention are useful to increase bottoms conversion at constant coke formation during a catalytic cracking process as compared to bottom conversions obtainable by conventional alumina sol based zeolitic catalytic cracking catalysts. Very significant increase in bottoms conversion during catalytic cracking can be achieved using the catalyst compositions of the invention, in some cases up to about 50% relative to using a conventional alumina sol based cracking catalyst, at constant coke formation. However, as will be understood by one skilled in the arts, the extent of bottoms reduction may depend on such factors as reactor temperature, catalyst to oil ratio and feedstock type. The current invention allows for control of matrix surface area in the catalyst of the invention independent of zeolite amount. Consequently, lower zeolite levels may be utilized in the catalysts while increasing matrix surface area. Advantageously, the catalytic cracking catalyst compositions of the invention accomplish an increase in bottoms conversion without an increase in catalytic activity due to an undesirable increase in the zeolite content of the catalyst.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

A catalyst composition comprising 20-wt % zeolite, 35-wt % added silica and precipitated alumina was prepared as follows: 3509 g of an ultra-stable Y zeolite were mixed with 6522 g of aluminum chlorhydrol and 1000 g of deionized water. 1412 g of Natka clay and 2234 g of precipitated silica (SA=181 m$^2$/g) were mixed into this solution. The mixture was then milled and spray dried. The spray-dried material was then calcined for 40 minutes at 400° C.

1800-2000 ml of deionized water was stirred at 65° C. 10-15 ml of 28-30% ammonium hydroxide was added to this water to increase the pH to 8.5-9.0. 400-600 g of the calcined material was then added to the mixture. Ammonium hydroxide was added to maintain a pH of about 7. Once the pH was stabilized at a pH of about 7 it was stirred for an additional 10 minutes. The catalyst was then filtered through a Buchner funnel using a vacuum. The catalyst was rinsed three times with 500 ml of 80 to 85° C. deionized water at a pH of about 7. The catalyst was then dried at 120° C.

The resulting catalyst had a matrix surface area of 148 m²/g, a zeolite surface area of 138 m²/g, and a zeolite to silica ratio of 0.57.

Example 2

A catalyst composition comprising 20-wt % zeolite, 35-wt % added silica and precipitated alumina was prepared as follows: 3509 g of an ultra-stable Y zeolite were mixed with 6522 g of aluminum chlorhydrol and 1000 g of deionized water. 1412 g of Natka clay and 2222 g of precipitated silica (SA=130 m²/g) were mixed into this solution. The mixture was then milled and spray dried. The spray-dried material was then calcined for 40 minutes at 400° C.

1800-2000 ml of deionized water was stirred at 65° C. 10-15 ml of 28-30% ammonium hydroxide was added to this water to increase the pH to 8.5-9.0. 400-600 g of the calcined material was then added to the mixture. Ammonium hydroxide was added to maintain a pH of about 7. Once the pH was stabilized at a pH of about 7 it was stirred for an additional 10 minutes. The catalyst was then filtered through a Buchner funnel using vacuum. The catalyst was rinsed 3 times with 500 ml of 80 to 85° C. deionized water at a pH of about 7. The catalyst was then dried at 120° C.

The resulting catalyst had a matrix surface area of 139 m²/g, a zeolite surface area of 138 m²/g, and a zeolite to silica ratio of 0.57.

Example 3

A catalyst composition comprising 20-wt % zeolite, 35-wt % silica and precipitated alumina was prepared as follows. 3509 g of an ultra-stable Y zeolite were mixed with 6522 g of aluminum chlorhydrol and 1000 g of deionized water. 1412 g of Natka clay and 2211 g of colloidal silica gel (Syloid 244 obtained from Grace Davison) were mixed into this solution. The mixture was then milled and spray dried. The spray-dried material was then calcined for 40 minutes at 400° C.

1800-2000 ml of deionized water was stirred at 65° C. 10-15 ml of 28-30% ammonium hydroxide was added to this water to increase the pH to 8.5-9.0. 400-600 g of the calcined material was then added to the mixture. Ammonium hydroxide was added to maintain a pH of about 7. Once the pH was stabilized at a pH of about 7 it was stirred for an additional 10 minutes. The catalyst was then filtered through a Buchner funnel using vacuum. The catalyst was rinsed 3 times with 500 ml of 80 to 85° C. deionized water at a pH of about 7. The catalyst was then dried at 120° C.

The resulting catalyst had a matrix surface area of 182 m²/g, a zeolite surface area of 133 m²/g, and a zeolite to silica ratio of 0.57.

Example 4

The catalytic cracking activity of a catalyst prepared as described in each of Examples 1-3 above were evaluated and compared to a commercially available cracking catalyst, Orion ULC 7698 (base catalyst), currently being sold by Grace Davison, a division of W. R. Grace & Co.-Conn. in Columbia, Md. This catalyst has an MSA of 46 m²/gm and a ZSA of 219 m²/gm. The catalysts were steamed in a fluidized bed for 4 hours at 816° C. with 100% steam and used to crack a hydrotreated gas oil (properties of the feed are displayed in Table 1) in a Davison Circulating Riser ("DCR"), which is designed to simulate the conditions of a conventional FCC unit. The description and operation of the DCR has been published in the following papers: G. W. Young, G. D. Weatherbee, and S. W. Davey, "Simulating Commercial FCCU Yields With The Davison Circulating Riser (DCR) Pilot Plant Unit", National Petroleum Refiners Association (NPRA) Paper AM88-52; G. W. Young, "Realistic Assessment of FCC Catalyst Performance in the Laboratory," in *Fluid Catalytic Cracking: Science and Technology*, J. S. Magee and M. M. Mitchell, Jr. Eds. Studies in Surface Science and Catalysis Volume 76, P. 257, Elsevier Science Publishers B. V., Amsterdam 1993, ISBN 0-444-89037-8.

Figure 3:
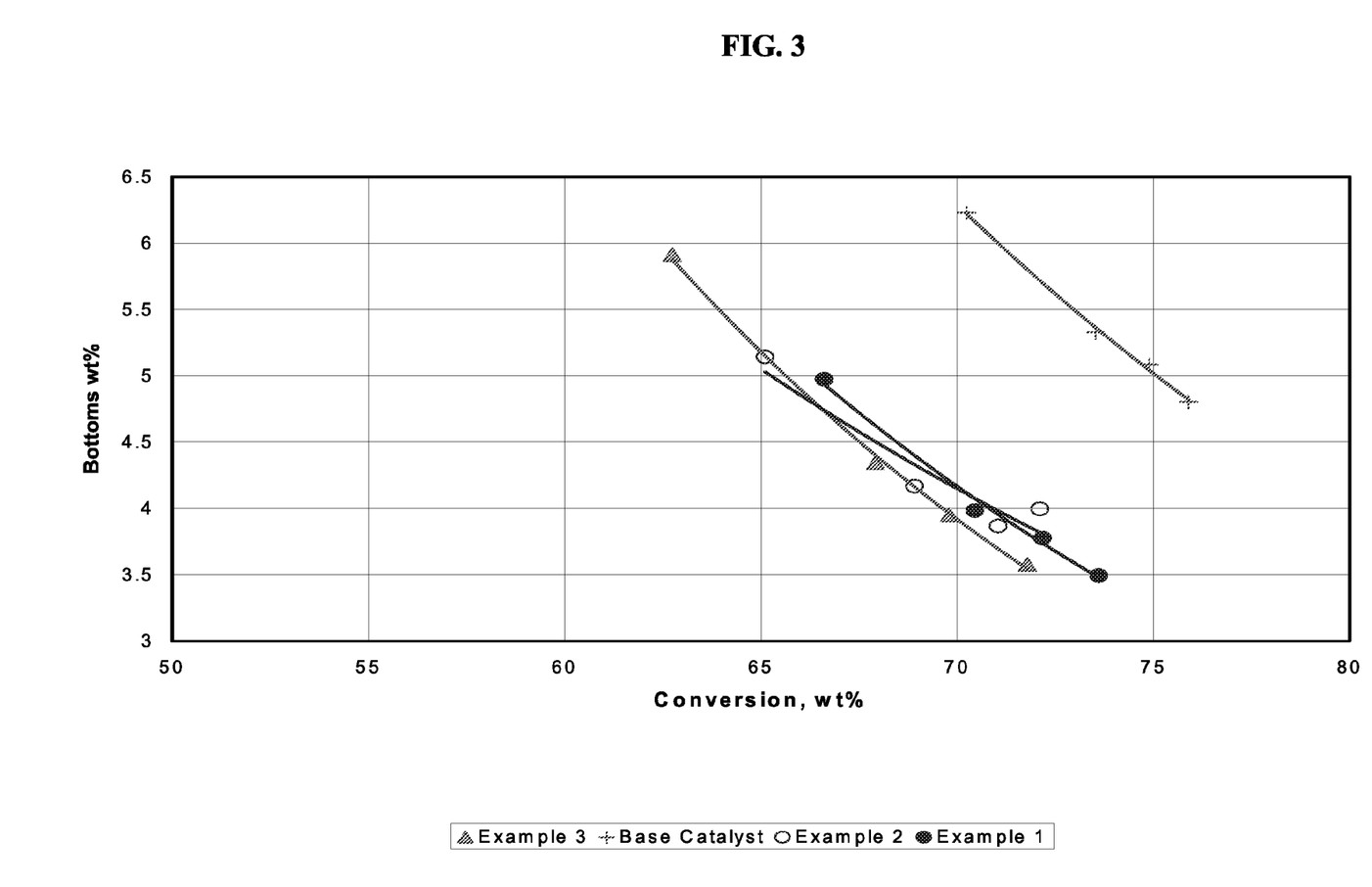
FIG. 3 is a graphic representation of weight percentage of bottoms yield versus the weight percentage of conversion.
Figure 4:
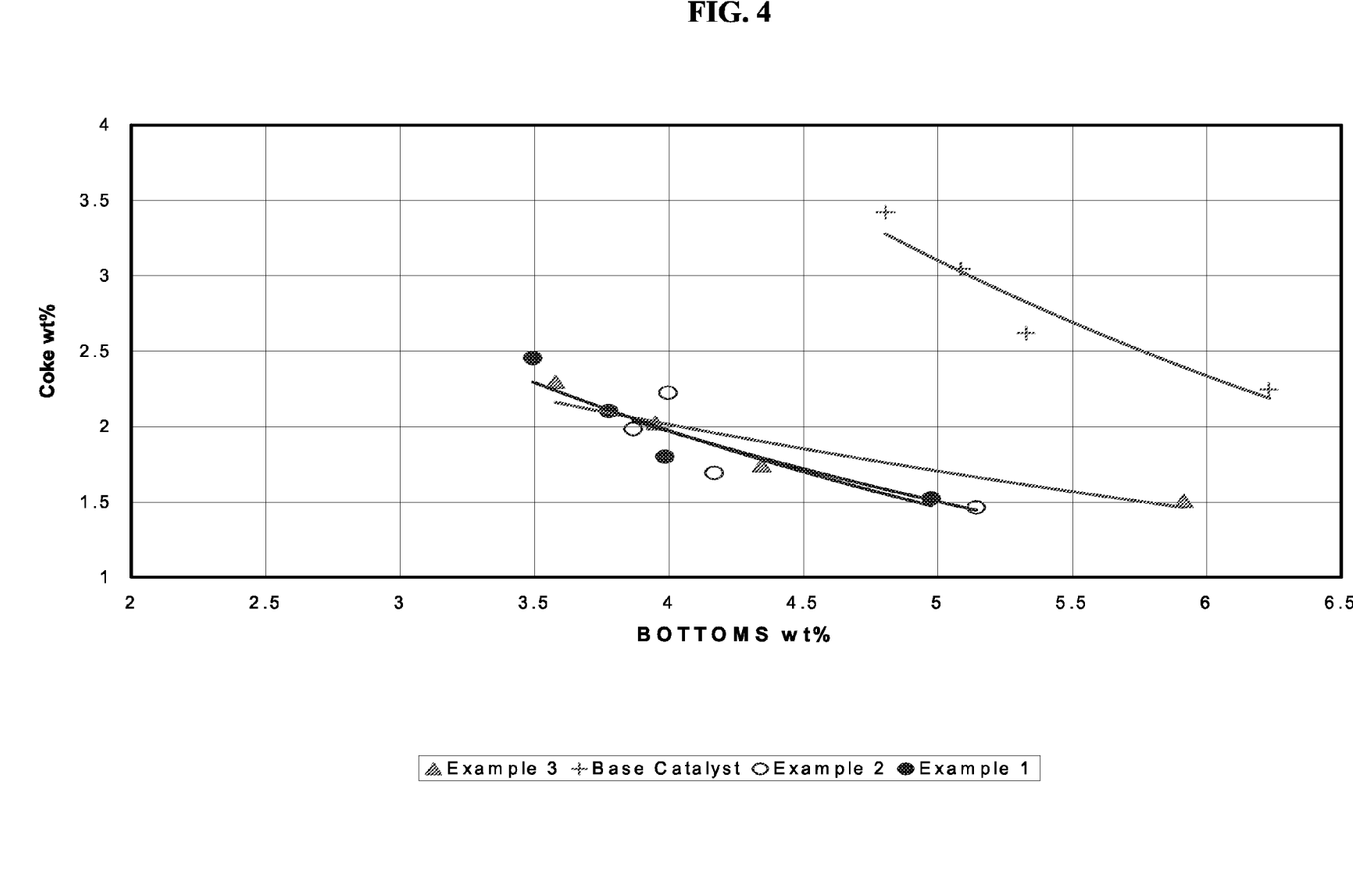
FIG. 4 is a graphic representation of the weight percentage of coke yield versus the weight percentage of bottoms yield.

The results are recorded in FIGS. 2 through 4 below.

Figure 1:
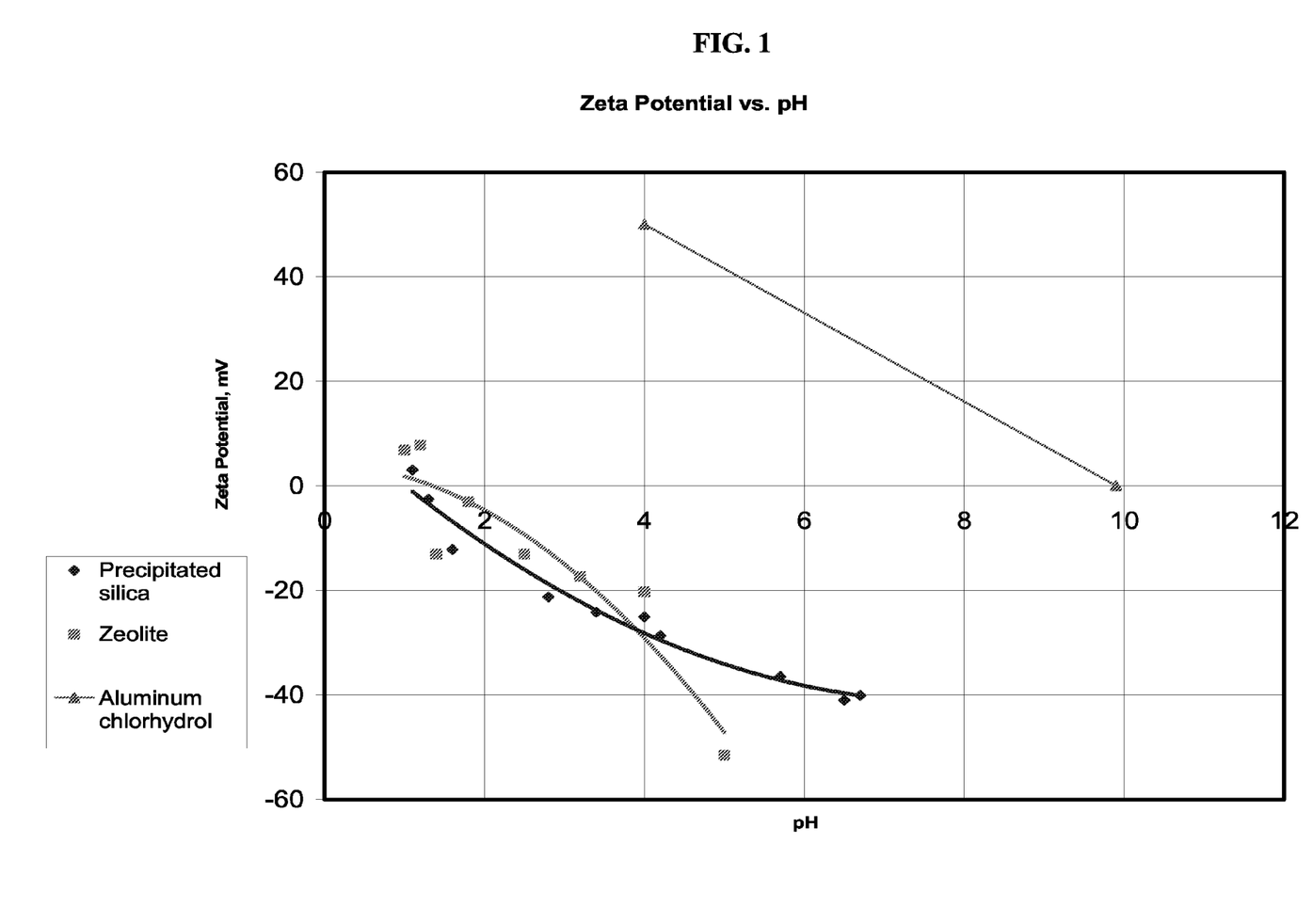
FIG. 1 is a graphical representation of the zeta potential of a substance as a function of pH.

FIG. 1 shows that the surface charge on a zeolite and on precipitated silica is negative at a pH of 7, whereas the surface charge on aluminum chlorhydrol is positive at pH of about 7.

Figure 2:
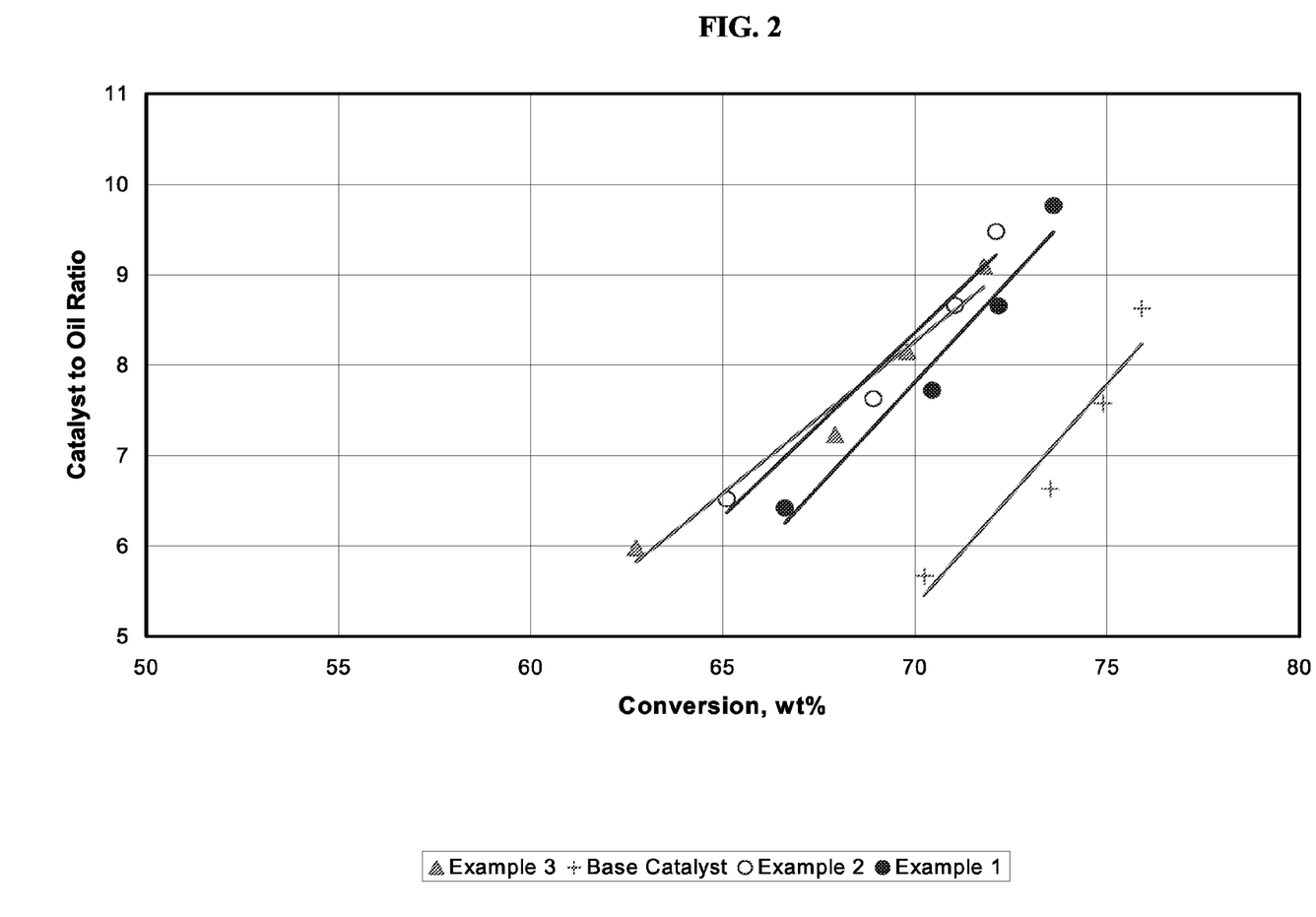
FIG. 2 is a graphic representation of the catalyst to oil ratio versus the weight percentage of conversion, with conversion defined as 100% minus the wt-% of liquid products that boil over 221° C.

FIG. 2 shows that the base catalyst had the most activity or lowest catalyst to oil ratio at a given conversion. FIG. 3 shows that catalyst compositions prepared in Examples 1-3 all have much lower bottoms yields at a constant conversion than the base catalyst. FIG. 4 shows that the catalysts prepared in accordance with Examples 1-3 have lower bottoms yields at a constant coke level when compared to the base catalyst.

TABLE 1

Feed Properties

| Property | Value |
| --- | --- |
| API Gravity @ 60° F. | 23.5 |
| Specific Gravity @ 60° F. | 0.9132 |
| Sulfur, wt. % | 0.035 |
| Total Nitrogen, wt. % | 0.12 |
| Basic Nitrogen, wt. % | 0.0462 |
| Conradson Carbon, wt. % | 0.03 |
| Ni, ppm | 0.5 |
| V, ppm | 0 |
| Fe, ppm | 4.6 |
| Na, ppm | 0 |
| Cu, ppm | 0.1 |
| K Factor | 11.5 |
| Refractive Index | 1.50245 |
| Average Molecular Weight | 332 |
| % Paraffinic Ring Carbons, Cp | 47.2 |
| % Naphthenic Ring Carbons, Cn | 37.2 |
| % Aromatic Ring Carbons, Ca | 15.6 |

What is claimed is:

1. A method of forming a catalytic cracking catalyst having a high matrix surface area, said method comprising
   a. forming an aqueous slurry comprising at least one zeolite particle having catalytic cracking activity under catalytic cracking conditions and a negative surface charge at a pH of about 7, at least one siliceous metal oxide having a negative surface change at a pH of about 7 and aluminum chlorhydrol;
   b. milling the slurry;
   c. spraying the milled slurry to formed catalyst particles;
   d. calcining the spray-dried catalyst particles at a temperature and for a time sufficient to remove volatiles;
   e. re-slurrying the calcined catalyst particles in an aqueous base solution at a pH of about 7 for a time and at a temperature sufficient to precipitate alumina throughout the catalyst particles; and
   f. removing the catalyst particles.

2. The method of claim 1 wherein the aqueous slurry comprises zeolite particles in an amount sufficient to provide from about 5 to about 60 wt % zeolite in the final catalyst composition.

3. The method of claim 1 wherein the zeolite particle is a faujasite zeolite.

4. The method of claim 1 wherein the aqueous slurry comprises the siliceous metal oxide in an amount sufficient to provide at least 5 wt % of siliceous metal oxide in the final catalyst composition.

5. The method of claim 1 wherein the siliceous metal oxide is selected from the group consisting of a precipitated silica, a silica gel, a zeolitic silica, a mesoporous silicia and mixtures thereof.

6. The method of claim 1 wherein the siliceous metal oxide is precipitated silica or a silica gel.

7. The method of claim 1 wherein aluminum chlorhydrol is present in the slurry in an amount sufficient to provide at about 5 to about 50 wt % precipitated alumina in the final catalyst composition.

8. The method of claim 7 wherein the calcined catalyst particles are re-slurried at a temperature ranging from about 5° C. to 90° C. for about 1 minute to about 2 hours.

9. The method of claim 1 wherein the calcined catalyst particles are re-slurried at a temperature ranging from about 5° C. to 90° C. for about 1 minute to about 2 hours.

10. The method of claim 1 wherein the base used to prepare the aqueous base solution of the re-slurry step is selected from the group consisting of sodium hydroxide, ammonium hydroxide, potassium hydroxide, tetramethylammonium hydroxide and mixtures thereof.

11. The method of claim 1 wherein the calcined catalyst particles are re-slurried at a temperature ranging from about 5° C. to 90° C. for about 1 minute to about 2 hours.

\* \* \* \* \*